US009451168B2

(12) United States Patent
Yamamoto (10) Patent No.: US 9,451,168 B2
(45) Date of Patent: Sep. 20, 2016

(54) PHOTOGRAPHING APPARATUS AND PHOTOGRAPHING CONTROL SYSTEM WITH LOW-PASS FILTER EFFECT

(71) Applicant: RICOH IMAGING COMPANY, LTD., Tokyo (JP)

(72) Inventor: Yasuhiro Yamamoto, Tokyo (JP)

(73) Assignee: RICOH IMAGING COMPANY, LTD., Tokyo (JP)

( * ) Notice: Subject to any disclaimer, the term of this patent is extended or adjusted under 35 U.S.C. 154(b) by 0 days.

(21) Appl. No.: 14/769,633

(22) PCT Filed: Mar. 3, 2014

(86) PCT No.: PCT/JP2014/055246
§ 371 (c)(1),
(2) Date: Aug. 21, 2015

(87) PCT Pub. No.: WO2014/141914
PCT Pub. Date: Sep. 18, 2014

(65) Prior Publication Data
US 2016/0006937 A1     Jan. 7, 2016

(30) Foreign Application Priority Data

Mar. 13, 2013 (JP) ................. 2013-050393

(51) Int. Cl.
*H04N 5/225* (2006.01)
*H04N 5/232* (2006.01)
(Continued)

(52) U.S. Cl.
CPC ............ *H04N 5/23287* (2013.01); *G03B 5/00* (2013.01); *H04N 5/2328* (2013.01);
(Continued)

(58) Field of Classification Search
CPC ............... H04N 5/353; H04N 5/3572; H04N 5/23287; H04N 5/2353
USPC ............................................ 348/342, 208.11
See application file for complete search history.

(56) References Cited

U.S. PATENT DOCUMENTS 6,587,148 B1    7/2003   Takeda et al.
8,387,880 B2    3/2013   Yamazaki et al.
(Continued)

FOREIGN PATENT DOCUMENTS

| JP | 9-116910 | 5/1997 |
|---|---|---|
| JP | 2008-35241 | 2/2008 |
| JP | 2010-87850 | 4/2010 |

OTHER PUBLICATIONS

Search report and Written Opinion from PCT/JP2014/055246, mailed Mar. 25, 2014.
U.S. Appl. No. 14/765,666 to Masakazu Terauchi et al., filed Aug. 4, 2015.

*Primary Examiner* — Antoinette Spinks
(74) *Attorney, Agent, or Firm* — Greenblum & Bernstein P.L.C.

(57) ABSTRACT

In a photographing apparatus and a photographing control system which drive an image sensor (moving member) to obtain an optical low-pass filter effect, an exposure time setter sets an exposure time; a drive cycle setter sets the drive cycle of the moving member so that the exposure time, which is set by the exposure time setter, becomes an integer multiple of the drive cycle; a moving member drive controller drives the moving member and controls the operation thereof via the moving member driver so that the moving member traces a predetermined path an integer number of times in a plane orthogonal to an optical axis within the exposure time, which is set by the exposure time setter, based on the drive cycle, which is set by the drive cycle setter.

6 Claims, 4 Drawing Sheets

(51) Int. Cl.
*G03B 5/00* (2006.01)
*H04N 5/353* (2011.01)
*H04N 5/357* (2011.01)
*H04N 5/235* (2006.01)
*H04N 9/04* (2006.01)
*G03B 7/093* (2006.01)

(52) U.S. Cl.
CPC ........... *H04N 5/2353* (2013.01); *H04N 5/353* (2013.01); *H04N 5/3572* (2013.01); *H04N 9/045* (2013.01); *G03B 7/093* (2013.01); *G03B 2205/0038* (2013.01); *H04N 2209/042* (2013.01)

(56) References Cited

U.S. PATENT DOCUMENTS

2010/0079825 A1* 4/2010 Yamazaki .............. G02B 27/46
    358/474
2015/0381894 A1* 12/2015 Terauchi ............ H04N 5/23248
    348/208.7
2016/0026068 A1* 1/2016 Yamamoto ........... H04N 5/2253
    348/342
2016/0094767 A1* 3/2016 Yamamoto ......... H04N 5/23258
    348/208.7

\* cited by examiner

PHOTOGRAPHING APPARATUS AND PHOTOGRAPHING CONTROL SYSTEM WITH LOW-PASS FILTER EFFECT

TECHNICAL FIELD

The present invention relates to a photographing apparatus and a photographing control system which are capable of obtaining an optical low-pass filter effect without the use of an optical low-pass filter.

BACKGROUND ART

Image sensors for use in photographing apparatuses such as digital still cameras, digital video cameras, or the like, sometimes create moiré and false color, etc., that do not originally exist on an object if light rays emanating from the object contain components of spatial frequency that exceeds the limit spatial frequency of the image sensor. To reduce the occurrence of such phenomena, an optical low-pass filter is conventionally used; however, if an optical low-pass filter is used, resolving power, a sense of resolution and contrast deteriorate.

Whereas, Patent Literature 1 discloses a photographing apparatus that achieves an optical low-pass filter effect to eliminate moiré, false color, etc., without the use of an optical low-pass filter by receiving object-emanating light rays via a plurality of pixels of different colors while moving an image sensor so that the image sensor traces a predetermined path (e.g., a circular path or a square path).

CITATION LIST

Patent Literature

Patent Literature 1: Japanese Unexamined Patent Publication No. 2008-35241

SUMMARY OF THE INVENTION

Technical Problem

However, in the photographing apparatus disclosed in Patent Literature 1, the optical low-pass filter effect is nonuniform, so that it is difficult to eliminate moiré, false color, etc., with stability. As a result of a detailed analysis of the disclosure of Patent Literature 1, the inventor of the present invention has found that object-emanating light rays are not incident on adjacent pixels of an image sensor uniformly (namely, the number of times of incidence of object-emanating light rays on some pixels does not coincide with the number of times of incidence of object-emanating light rays on the remaining pixels) when taking a photograph because no consideration is given to the relationship between the drive cycle of the image sensor (the time required for the image sensor to trace a predetermined path once) and the exposure time, which is a cause of making the optical low-pass filter effect nonuniform and making it difficult to eliminate moiré, false color, etc., with stability.

The present invention has been completed based on the above described findings, and an object of the present invention is to achieve a uniform optical low-pass filter effect to thereby eliminate moiré, false color, etc., with stability by optimally setting the drive cycle of the image sensor (moving member) in accordance with an exposure time in a photographing apparatus and a photographing control system which obtain optical low-pass filter effect by driving the image sensor (moving member).

Solution to Problem

The photographing apparatus according to the present invention is provided, including an image sensor, to which an object image that is formed from object-emanating light rays passed through a photographing optical system, provided in said photographing apparatus, is exposed, and which converts the object image thus exposed into an electrical pixel signal; a moving member driver which provides an optical low-pass filter effect by making the object-emanating light rays incident on a plurality of pixels of the image sensor which are mutually different in detection color by driving a moving member that includes at least one of a lens, which constitutes at least a portion of optical elements including the photographing optical system for formation of the object image, and the image sensor in a plane orthogonal to an optical axis of the photographing optical system so as to trace a predetermined path; an exposure time setter which sets an exposure time; a drive cycle setter which sets a drive cycle of the moving member so that the exposure time, which is set by the exposure time setter, becomes an integer multiple of the drive cycle of the moving member; and a moving member drive controller which drives the moving member and controls operation thereof via the moving member driver so that the moving member traces the predetermined path in the orthogonal plane within the exposure time, which is set by the exposure time setter, based on the drive cycle, which is set by the drive cycle setter.

The drive cycle setter can set the drive cycle of the moving member so that the exposure time, which is set by the exposure time setter, becomes more than double than that of the drive cycle of the moving member. The moving member drive controller can drive the moving member and control the operation thereof via the moving member driver so that the moving member traces the predetermined path twice or more in the orthogonal plane within the exposure time, which is set by the exposure time setter, based on the drive cycle, which is set by the drive cycle setter.

It is desirable for the photographing apparatus to include a determiner which determines whether or not the exposure time, which is set by the exposure time setter, exceeds a predetermined period of time. When determining that the exposure time, which is set by the exposure time setter, does not exceed the predetermined period of time, the drive cycle setter sets the drive cycle of the moving member so that the exposure time, which is set by the exposure time setter, becomes an integer multiple of the drive cycle. When determining that the exposure time, which is set by the exposure time setter, exceeds the predetermined period of time, the drive cycle setter sets the drive cycle of the moving member without regard to a relationship between the drive cycle and the exposure time, which is set by the exposure time setter.

The predetermined path that the moving member traces can include a rotationally symmetrical circular or square path having a center thereof on the optical axis of the photographing optical system.

In another embodiment, a photographing apparatus according to the present invention can include an image sensor, to which an object image that is formed from object-emanating light rays passed through a photographing optical system is exposed, and which converts the object image thus exposed into an electrical pixel signal; a moving member driver which provides an optical low-pass filter effect by making the object-emanating light rays incident on a plurality of pixels of the image sensor which are mutually different in detection color by driving a moving member that includes at least one of a lens, which constitutes at least a portion of optical elements including the photographing optical system for formation of an object image, and the image sensor in a plane orthogonal to an optical axis of the photographing optical system so as to trace a predetermined path; an exposure time setter which sets an exposure time; a drive cycle setter which sets a drive cycle which is a time required for the moving member to be driven so that the moving member traces the predetermined path once in the orthogonal plane in accordance with the exposure time, which is set by the exposure time setter; and a moving member drive controller which drives the moving member and controls operation thereof via the moving member driver so that the moving member traces the predetermined path in the orthogonal plane within the exposure time, which is set by the exposure time setter, based on the drive cycle, which is set by the drive cycle setter.

A photographing control system is provided, including an image sensor, to which an object image that is formed from object-emanating light rays passed through a photographing optical system is exposed, and which converts the object image thus exposed into an electrical pixel signal; a moving member driver which provides an optical low-pass filter effect by making the object-emanating light rays incident on a plurality of pixels of the image sensor which are mutually different in detection color by driving a moving member that includes at least one of a lens, which constitutes at least a portion of optical elements including the photographing optical system for formation of an object image, and the image sensor in a plane orthogonal to an optical axis of the photographing optical system so as to trace a predetermined path; an exposure time setter which sets an exposure time; a drive cycle setter which sets a drive cycle of the moving member so that the exposure time, which is set by the exposure time setter, becomes an integer multiple of the drive cycle of the moving member; and a moving member drive controller which drives the moving member and controls operation thereof via the moving member driver so that the moving member traces the predetermined path in the orthogonal plane within the exposure time, which is set by the exposure time setter, based on the drive cycle, which is set by the drive cycle setter.

In the present specification, the term "the drive cycle of an image sensor (moving member)" refers to the time required for the image sensor to be driven so as to trace a predetermined path once in a plane orthogonal to an optical axis of a photographing optical system. Therefore, for instance, the image sensor traces the predetermined path once within an exposure time when the drive cycle of the image sensor is identical to the exposure time, the image sensor traces the predetermined path twice within an exposure time when the drive cycle of the image sensor is one half of the exposure time, and the image sensor repeats the tracing of the predetermined path three times within an exposure time when the drive cycle of the image sensor is one third of the exposure time.

ADVANTAGEOUS EFFECTS OF THE INVENTION

According to the present invention, since the drive cycle setter sets the drive cycle of the image sensor (moving member) so that the exposure time, which is set by the exposure time setter, becomes an integer multiple of the drive cycle and since the image sensor drive controller (moving member drive controller) drives the image sensor and controls the operation thereof via the image sensor driver (moving member drive portion) so that the image sensor traces the predetermined path an integer number of times in a plane orthogonal to the optical axis within the exposure time, which is set by the exposure time setter, based on the drive cycle, which is set by the drive cycle setter, it is possible to achieve a uniform optical low-pass filter effect, thus being capable of eliminating moiré, false color, etc., with stability.

BRIEF DESCRIPTION OF DRAWINGS

FIGS. 4(A) and (B) show diagrams illustrating operations for providing an optical low-pass filter effect by driving an image sensor so that it traces a predetermined path, wherein 4 (A) is a diagram illustrating the case where the image sensor is driven to trace a rotationally symmetrical circular path about an optical axis of a photographing optical system, and 4(B) is a diagram illustrating the case where the image sensor is driven to trace a rotationally symmetrical square path about the axis of the photographing optical system.

EMBODIMENT

An embodiment of a digital camera (photographing apparatus/photographing control system) 10 according to the present invention will be hereinafter discussed with reference to FIGS. 1 through 5

Figure 1:
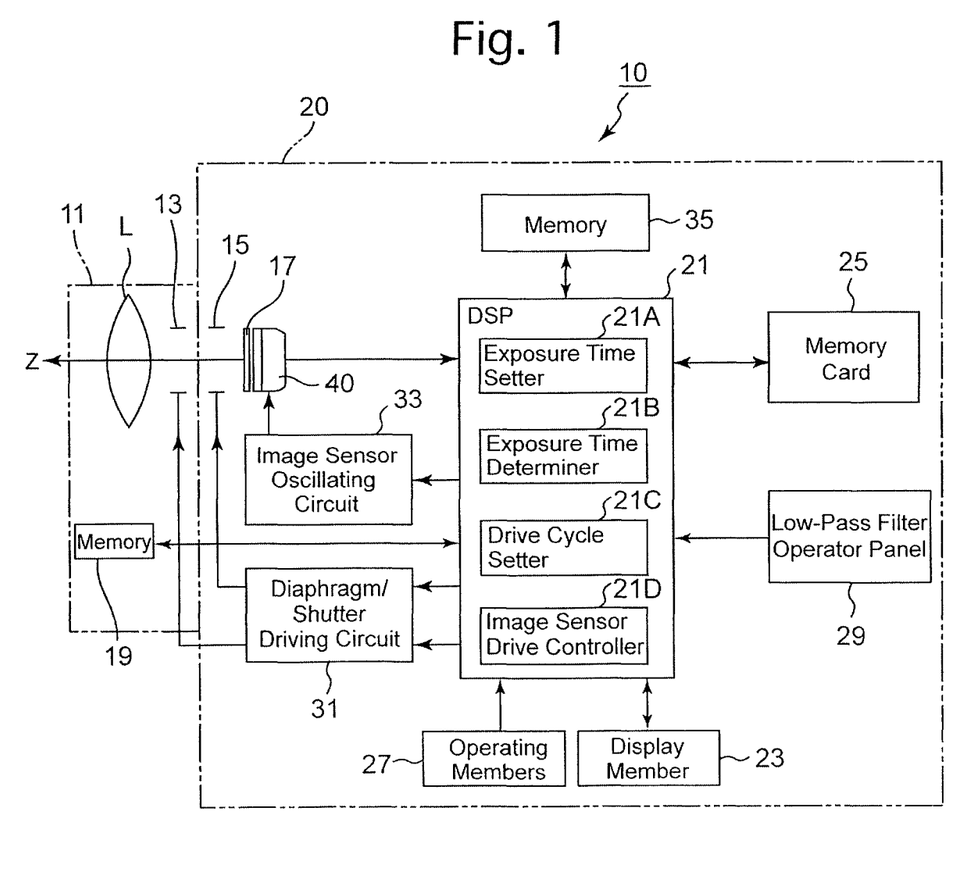
FIG. 1 is a block diagram showing main components of a digital camera (photographing apparatus) according to the present invention.

As shown in FIG. 1, the digital camera 10 is provided with a photographic lens 11 which is detachably attached to the camera body 20 of the digital camera 10. The photographic lens 11 is provided with a photographing lens group L (moving member/shake-correction member) and a diaphragm 13, in that order from the object side (the left side with respect to the drawings), and the camera body 20 is provided with a shutter 15 and an image sensor (moving member/shake-correction member) 17. An object image formed by object-emanating light rays, which enter from the photographing lens group L and pass through the diaphragm 13 and the fully-opened shutter 15, is formed on the image sensor 17 and is exposed. The object image thus formed on the image sensor 17 is converted into an electrical image signal using a large number of pixels arranged in a matrix, and this signal is output as an image signal to a DSP (CPU) 21. The DSP 21 performs a predetermined process on the image signal to display an image on a display member 23 and writes image data onto a memory card 25. The DSP 21 is connected to operating members 27, a low-pass filter operator panel 29, a diaphragm/shutter drive circuit 31, an image sensor oscillating circuit (image sensor driver/moving member driver/shake-correction member driver) 33 and a memory 35. The operating members 27 include a power switch and a release switch, etc.; the low-pass filter operator panel 29 includes a switch to turn ON and OFF a low-pass filter operation, an adjusting switch to adjust the low-pass filter effect, and a direction selection switch to select the oscillating direction of the image sensor during the low-pass filter operation; a diaphragm/shutter drive circuit 31 is for driving and controlling the operations of the diaphragm 13 and the shutter 15, and data on the low-pass filter has been written into the memory 35. The photographic lens 11 incorporates a memory 19 which has stored therein information on the aperture diameter (aperture value) of the diaphragm 13 and information on the resolving power (MTF) of the photographing lens group L, and the DSP 21 reads this information. The photographing lens group L includes a plurality of lens groups with the diaphragm 13 generally positioned therebetween in the optical axis direction.

Figure 2:
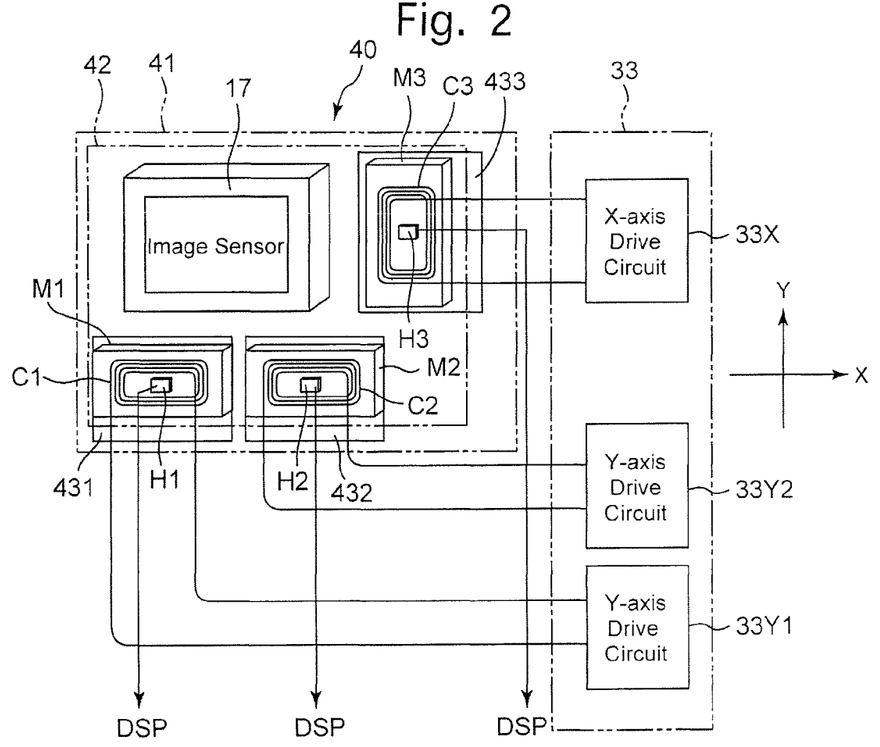
FIG. 2 is a block diagram showing main components of an image shake correcting apparatus (image sensor driver) of the digital camera (photographing apparatus) according to the present invention.
Figure 3:
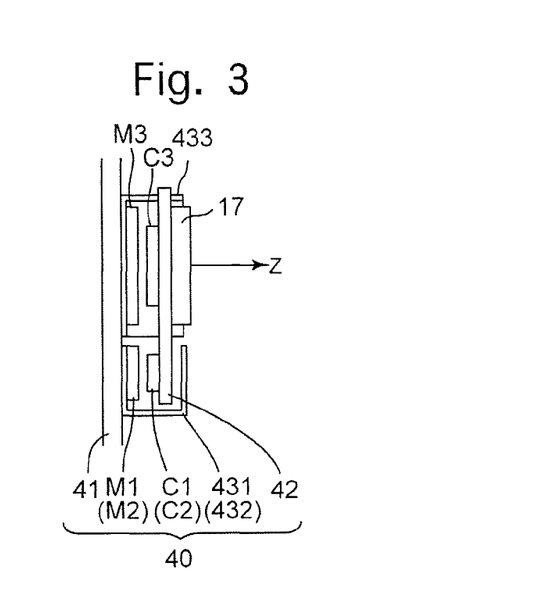
FIG. 3 is a side elevational view of the image shake correcting apparatus (image sensor driver) of the digital camera (photographing apparatus), illustrating the structure thereof.
Figure 4:
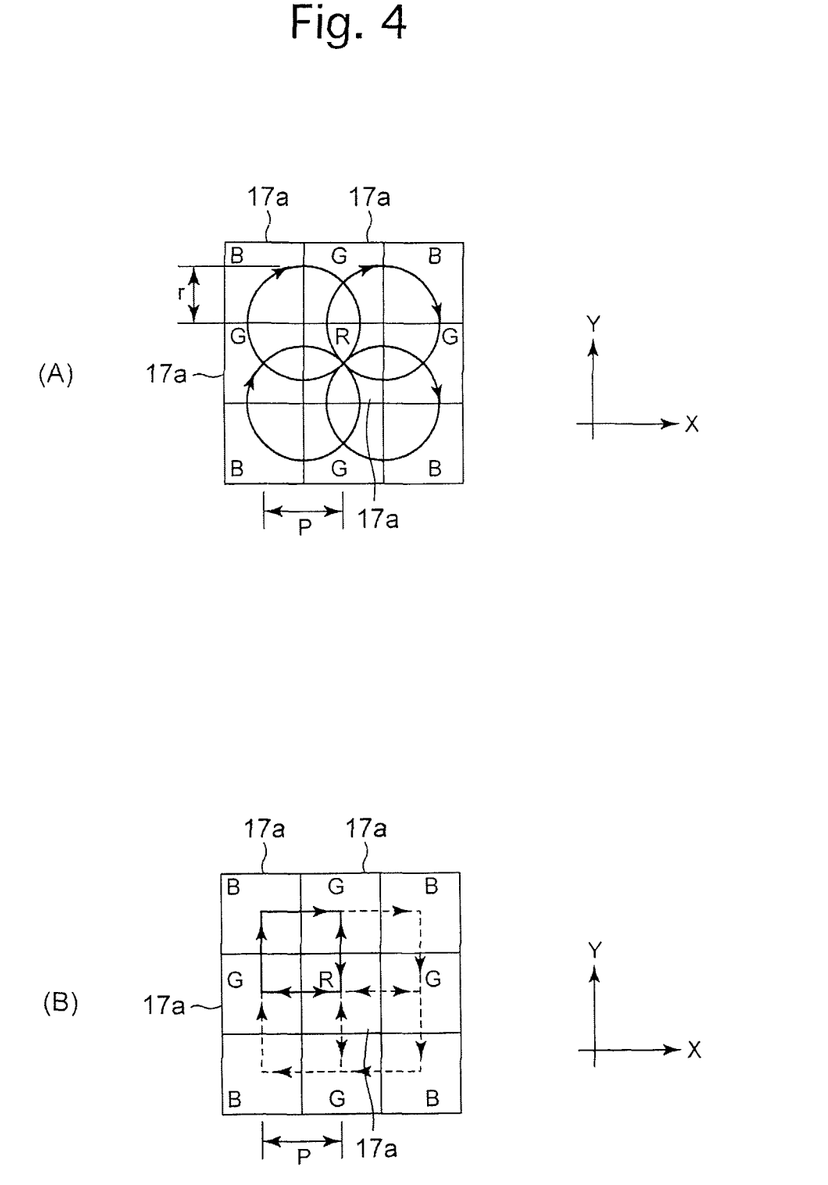
Figure 5:
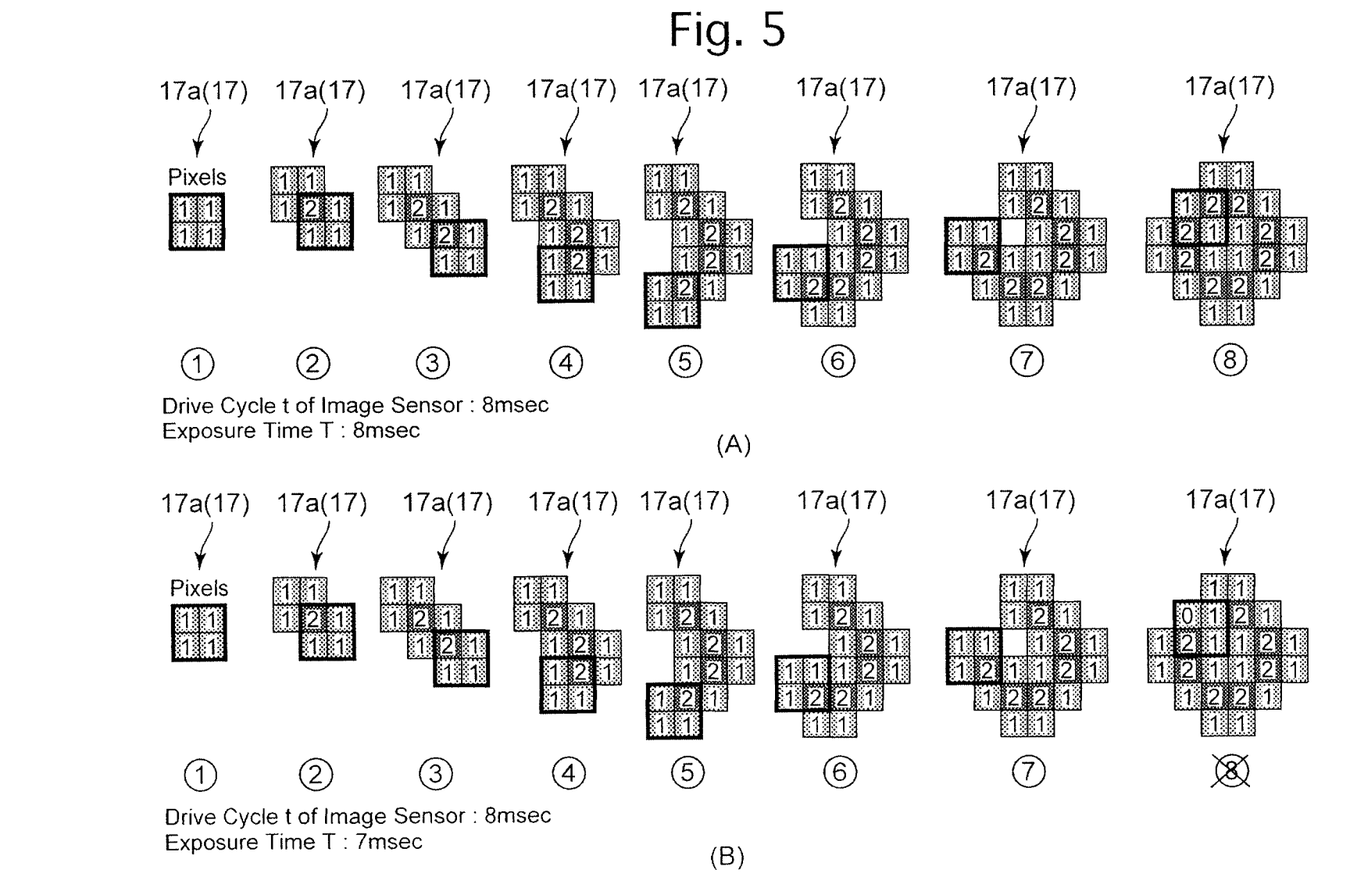
FIG. 5(A) shows diagrams illustrating object-emanating light rays incident on adjacent pixels of the image sensor when the drive cycle of the image sensor and an exposure time are in synchronization with each other (when an exposure time is an integer multiple of the drive cycle)
FIG. 5(B) shows diagrams illustrating object-emanating light rays incident on adjacent pixels of the image sensor when the drive cycle of the image sensor and an exposure time are not in synchronization with each other (when an exposure time is not an integer multiple of the drive cycle).

As shown in FIGS. 1 through 3, the image sensor 17 is mounted onto an image shake correcting apparatus (image sensor driver/moving member driver/shake-correction member driver) 40 in a manner to be movable in an X-axis direction and a Y-axis direction (two orthogonal directions) which are orthogonal to an optical axis Z of the photographic lens 11. The image shake correcting apparatus 40 is provided with a fixed support board 41, a movable stage 42, magnets M1, M2 and M3, yokes 431, 432 and 433, and drive coils C1, C2 and C3. The fixed support board 41 is fixed to a structural member of the camera body 20 such as a chassis, the movable stage 42 is fixed to the image sensor 17 and is slidable relative to the fixed support board 41, the magnets M1, M2 and M3 are fixed to surfaces of the fixed support board 41 which face the movable stage 42; the yokes 431, 432 and 433 are made of a magnetic material and are fixed to the fixed support board 41 to face the magnets M1, M2 and M3 with the movable stage 42 positioned between the fixed support board 41 and the yokes 431, 432 and 433 to form a magnetic circuit between each yoke 431, 432 and 433 and the associated magnet M1, M2 or M3; and the drive coils C1, C2 and C3 are fixed to the movable stage 42 and each generate a driving force by receiving an electric current within the magnetic field of the aforementioned magnetic circuit. Applying an AC voltage to the drive coils C1, C2 and C3 from the image sensor oscillating circuit 33 causes the movable stage 42 to oscillate relative to the fixed support board 41.

In this embodiment, a magnetic driver configured of the magnet M1, the yoke 431 and the drive coil C1, and a magnetic driver configured of the magnet M2, the yoke 432 and the drive coil C2 (i.e., two magnetic drivers) are arranged along the lengthwise direction of the image sensor 17 (horizontal direction/the X-axis direction) with a predetermined distance therebetween; and a magnetic driver (one magnetic driver) configured of the magnet M3, the yoke 433 and the drive coil C3 is arranged along the short side direction of the image sensor 17 that is orthogonal to the lengthwise direction of the image sensor 17 (perpendicular (orthogonal) direction/the Y-axis direction). The image sensor oscillating circuit 33 is provided with Y-axis drive circuits 33Y1 and 33Y2 and an X-axis drive circuit 33X which independently control currents supplied to the drive coils C1, C2 and C3, respectively.

Hall sensors H1, H2 and H3 which detect the magnetic forces of the magnets M1, M2 and M3 to detect the position of the movable stage 42 are arranged on the fixed support board 41 in the vicinity of (in the central hollow spaces of) the drive coils C1 through C3, respectively. The position in the Y-axis direction and the inclination (rotation) of the movable stage 42 are detected by the Hall sensors H1 and H2, and the position of the movable stage 42 in the X-axis direction is detected by the Hall sensor H3. The DSP 21 passes a driving current through each drive coil C1 through C3 via the Y-axis drive circuit 31Y1 and 31Y2 and the X-axis drive circuit 33X while detecting the position of the movable stage 42 from the outputs of the Hall sensors H1, H2 and H3 to move the movable stage 42 along a predetermined path and track at a predetermined speed (period). During image shake correcting operation, the DSP 21 detects vibrations of the digital SLR camera 10 using acceleration sensors (not shown) and controls the driving of the movable stage 42 (the image sensor 17) to reduce image shake via the image sensor oscillating circuit 33 in a manner to prevent the object image from moving relative to the image sensor 17.

The image sensor oscillating circuit 33 and the image shake correcting apparatus 40 constitute an image sensor driver (moving member driver/ shake-correction member driver) which reproduces the effects of an optical low-pass (may also be referred to as an LPF effect in the following descriptions) by making object-emanating light rays incident on a plurality of pixels of the image sensor 17 which are mutually different in detection color by driving the image sensor 17 in a manner such that the image sensor 17 traces a predetermined path in a plane orthogonal to the optical axis Z of the photographic lens 11.

With reference to FIGS. 4(A) and (B), the low-pass filter operation of the image sensor driver (the image sensor oscillating circuit 33 and the image shake correcting apparatus 40) that provides an LPF effect using the image sensor 17 by driving the image sensor 17 so that it traces a predetermined path will be discussed hereinafter. In these drawings, the image sensor 17 is provided with a large number of pixels 17a which are arranged in a matrix at a predetermined pixel pitch P on the light receiving surface, and one of color filters R, G and B arranged in Bayer pattern is positioned on the front surface of each pixel 17a. Each pixel 17a detects a color of object-emanating light rays which are incident on the pixel 17a after passing through the color filter R, G or B on the front surface thereof; specifically, each pixel 17a converts light of the color component (color band) into an electrical signal and accumulates electric charge according to the intensity (brightness) of the light.

FIG. 4(A) shows the case where the image sensor 17 is driven to trace a rotationally symmetrical circular path having the center thereof on the optical axis Z of the photographic lens 11. This circular path is a circular closed path having a radius r of $2^{1/2}/2$ times the pixel pitch P of the image sensor 17. FIG. 4(B) shows the case where the image sensor 17 is driven to trace a rotationally symmetrical square path having the center thereof on the optical axis Z of the photographic lens 11. This square path is a square closed path, each side of which has a length equal to the pixel pitch P of the image sensor 17. In FIG. 4(B), the image sensor 17 is driven alternately in the Y-axis direction of the pixels 17a, which is parallel to one of mutually orthogonal alignment directions (perpendicular direction) of the pixels 17a, and in the X-axis direction of the pixels 17a, which is parallel to the other direction (horizontal direction), per unit of the pixel pitch P so that the image sensor 17 moves in the square closed path.

If the image sensor 17 is driven to trace the predetermined circular or square path during an exposure as shown in FIGS. 4(A) and (B), the object-emanating light rays (ray bundle) incident on the center of each color filter R, G and B (each pixel 17a) are equally incident on four color filters R, G, B and G, so that the effect equivalent to that obtained using an optical low-pass filter is obtained. Namely, the light rays incident on any of the color filters R, G, B and G (the pixels 17a) are reliably incident on the peripheral color filters R, G, B and G (the peripheral pixels 17a), so that the effect (an LPF effect) equivalent to that obtained in the case where the light rays are passed through an optical low-pass filter is obtained.

The LPF effect can be adjusted by changing the moving range and path of the image sensor 17, e.g., by varying the radius r in the case where the path is circular in shape or by varying the length (side length) of one side of the path in the case where the path is square in shape. Accordingly, the LPF effect is enhanced as the radius r of the circular path or the length of one side of the square path is increased (as the range of the pixels 17a (the color filters R, G, B and G) of the image sensor 17, on which object-emanating light rays are incident, which are mutually different in detection color is enlarged). On the other hand, the LPF effect is weakened as the radius r or the length of the one side is decreased (as the range of the pixels 17a (the color filters R, G, B and G) of the image sensor 17, on which object-emanating light rays are incident, which are mutually different in detection color is reduced).

As shown in FIG. 1, the DSP 21 of the digital camera 10 is provided with an exposure time setter 21A, an exposure time determiner (determiner) 21B, a drive cycle setter 21C and an image sensor drive controller (moving member drive controller/shake-correction member drive controller) 21D.

The exposure time setter 21A sets an exposure time T according to, e.g., various parameters such as the f-number of the aperture 13, the shutter speed of the shutter 15, ISO sensitivity and exposure value.

The exposure time determiner 21B determines whether or not the exposure time set by the exposure time setter 21A exceeds a predetermined period of time $T_{threshold}$ and outputs the result of this determination to the drive cycle setter 21C. The predetermined period of time $T_{threshold}$ can be set, e.g., within a range from 80 msec to 120 msec, though not limited thereto. The case where $T_{threshold}$ is set at 80 msec will be illustrated hereinafter by example.

When determining that the exposure time T, which is set by the exposure time setter 21A, does not exceed the predetermined period of time $T_{threshold}$, the drive cycle setter 21C sets a drive cycle t of the image sensor 17 so that the exposure time T, which is set by the exposure time setter 21A, becomes an integer multiple of the drive cycle t of the image sensor 17. For instance, when the exposure time, which is set by the exposure time setter 21A, is 40 msec and does not exceed the predetermined period of time $T_{threshold}$ (=80 msec), the drive cycle setter 21C sets the drive cycle t of the image sensor 17 at 8 msec, 10 msec, 20 msec or 40 msec.

The drive cycle setter 21C sets the drive cycle t of the image sensor 17 without regard to the relationship between the drive cycle t and the exposure time T (without regard to whether or not the exposure time T becomes an integer multiple of the drive cycle t) when determining that the exposure time T, which is set by the exposure time setter 21A, exceeds the predetermined period of time $T_{threshold}$. For instance, when the exposure time T that is set by the exposure time setter 21A is 500 msec and exceeds the predetermined period of time $T_{threshold}$ (=80 msec), the drive cycle setter 21C sets the drive cycle t of the image sensor 17 at 9 msec, 15 msec, 30 msec or 40 msec.

In the present specification, the term "the drive cycle t of the image sensor 17" refers to the time required for the image sensor 17 to be driven so as to trace a predetermined path (e.g., a circular path or a square path) once in a plane orthogonal to the optical axis Z of the photographic lens 11. Therefore, for instance, the image sensor 17 traces the predetermined path once within the exposure time T when the drive cycle t of the image sensor 17 is identical to the exposure time T (i.e., t =T), the image sensor 17 traces the predetermined path twice within the exposure time T when the drive cycle t of the image sensor 17 is one half of the exposure time T (i.e., 2t =T), and the image sensor 17 traces the predetermined path three times within the exposure time T when the drive cycle t of the image sensor 17 is one third of the exposure time T (i.e., 3t =T).

When the exposure time determiner 21B determines that the exposure time T, which is set by the exposure time setter 21A, does not exceed the predetermined period of time $T_{threshold}$, the image sensor drive controller 21D drives the image sensor 17 and controls the operation thereof via the image sensor driver (the image sensor oscillating circuit 33 and the image shake correcting apparatus 40) so that the image sensor 17 traces a predetermined path (e.g., a circular path or a square path) an integer number of times in a plane orthogonal to the optical axis within the exposure time T, which is set by the exposure time setter 21A, based on the drive cycle t that is set by the drive cycle setter 21C.

When the exposure time determiner 21B determines that the exposure time T, which is set by the exposure time setter 21A, exceeds the predetermined period of time $T_{threshold}$, the image sensor drive controller 21D drives the image sensor 17 and controls the operation thereof via the image sensor driver (the image sensor oscillating circuit 33 and the image shake correcting apparatus 40) within the exposure time T, which is set by the exposure time setter 21A, based on the drive cycle t set by the drive cycle setter 21C without regard to the relationship between the drive cycle t and the exposure time T.

FIGS. 5(A) and (B) are diagrams illustrating object-emanating light rays incident on adjacent pixels of the pixels 17a of the image sensor 17 when the drive cycle t of the image sensor 17 and the exposure time T are in synchronization with each other (when the exposure time T is an integer multiple of the drive cycle t) and when the drive cycle t of the image sensor 17 and the exposure time T are not in synchronization with each other (when the exposure time T is not an integer multiple of the drive cycle t), respectively. In the example shown in FIG. 5(A), each of the drive cycle t of the image sensor 17 and the exposure time T is 8 msec. In the example shown in FIG. 5(B), the drive cycle t of the image sensor 17 is 8 msec and the exposure time T is 7 msec.

In the present embodiment, as shown in FIG. 5(A), by synchronizing the drive cycle t of the image sensor 17 and the exposure time T with each other, an exposure is terminated upon the image sensor 17 tracing the predetermined path an integer number of times (twice or more is of course possible though once in the present embodiment) within the exposure time T to thereby make it possible to make object-emanating light rays incident on adjacent four pixels of the image sensor 17 uniformly during picture taking (during an exposure). Namely, the number of times of incidence of object-emanating light rays on some pixels of the image sensor 17 can be made to coincide with the number of times of incidence of object-emanating light rays on the remaining pixels. This makes it possible to achieve a uniform optical low-pass filter effect, thus making it possible to eliminate moiré, false color, etc., with stability.

Whereas, as shown in FIG. 5(B), when the drive cycle t of the image sensor 17 and the exposure time T are not in synchronization with each other, an exposure is terminated in a state where the image sensor 17 has incompletely traced the predetermined path (a state where the image sensor 17 has traced a circular arc portion of a full-circular path), so that it is impossible to make object-emanating light rays incident on adjacent four pixels of the image sensor 17 uniformly during picture taking (during an exposure). Namely, the number of times of incidence of object-emanating light rays on some pixels of the image sensor 17 is not coincident with the number of times of incidence of object-emanating light rays on the remaining pixels, which is a cause of making the optical low-pass filter effect nonuniform and making it difficult to eliminate moiré, false color, etc., with stability.

Due to earnest research carried out by the present inventor, when the exposure time T, which is set by the exposure time setter 21A, exceeds the predetermined period of time $T_{threshold}$, the exposure time T becomes sufficiently great relative to the drive cycle t of the image sensor t, which consequently causes the image sensor 17 to trace the predetermined path more than a predetermined number of times (e.g., ten times), so that it has been proven that degradation of a photographed image is small enough to be ignored even if an exposure is terminated in a state where the image sensor 17 has incompletely traced the predetermined path (a state where the image sensor 17 has traced a circular arc portion of a full-circular path).

Accordingly, in the present embodiment, the drive cycle t of the image sensor 17 is set so that the exposure time T, which is set by the exposure time setter 21A, becomes an integer number of times when the exposure time determiner 21B determines that the exposure time T, which is set by the exposure time setter 21A, does not exceed the predetermined period of time $T_{threshold}$, while the drive cycle t of the image sensor 17 is set without regard to the relationship between the drive cycle t and the exposure time T when the exposure time determiner 21B determines that the exposure time T, which is set by the exposure time setter 21A, exceeds the predetermined period of time $T_{threshold}$.

As described above, in the present embodiment of the digital camera (photographing apparatus) 10, the drive cycle setter 21C sets the drive cycle t of the image sensor 17 so that the exposure time T, which is set by the exposure time setter 21A, becomes an integer multiple of the drive cycle t, and the image sensor drive controller 21D drives the image sensor 17 and controls the operation thereof via the image sensor driver (33 and 40) so that the image sensor 17 traces the predetermined path an integer number of times in a plane orthogonal to the optical axis within the exposure time T, which is set by the exposure time setter 21A, based on the drive cycle t set by the drive cycle setter 21C. This makes it possible to achieve a uniform optical low-pass filter effect to thereby eliminate moiré, false color, etc., with stability by optimally setting the drive cycle t of the image sensor 17 in accordance with the exposure time T.

In the above described embodiment, the case where the drive cycle t of the image sensor 17 is set without regard to the relationship between the drive cycle t and the exposure time T (without regard to whether or not the exposure time T becomes an integer multiple of the drive cycle t) when the exposure time T, which is set by the exposure time setter 21A, exceeds the predetermined period of time $T_{threshold}$ has been illustrated by example. However, even when the exposure time T, which is set by the exposure time setter 21A, exceeds the predetermined period of time $T_{threshold}$, the drive cycle t of the image sensor 17 can be set so that the exposure time T, which is set by the exposure time setter 21A, becomes an integer multiple of the drive cycle t.

In the above described embodiment, the case where the image sensor drive controller 21D drives the image sensor 17 and controls the operation thereof via the image sensor driver (33 and 40) so that the image sensor 17 traces a predetermined path an integer number of times in a plane orthogonal to the optical axis within the exposure time T, which is set by the exposure time setter 21A, based on the drive cycle t set by the drive cycle setter 21C has been illustrated by example. However, the image sensor drive controller 21D can also take the moving range and path of the image sensor 17 into account in addition to the drive cycle t that is set by the drive cycle setter 21C. For instance, the image sensor drive controller 21D can set the moving range and path of the image sensor 17 in accordance with a desired LPF effect when the exposure time T, which is set by the exposure time setter 21A, exceeds the predetermined period of time $T_{threshold}$, and the image sensor drive controller 21D can set the moving range and path of the image sensor 17 in the range in which the exposure time T, which is set by the exposure time setter 21A, becomes an integer multiple of the drive cycle t when the exposure time T, which is set by the exposure time setter 21A, does not exceed the predetermined period of time $T_{threshold}$.

Although an embodiment in which the image sensor 17 is driven as "a moving member" in a plane orthogonal to the optical axis has been illustrated by example in the above described embodiment, the present invention is not limited thereto. For instance, an embodiment in which a lens that constitutes at least a portion of the optical elements, including the photographing lens group (photographing optical system) L, for the formation of an object image is driven as "a moving member" in a plane orthogonal to the optical axis by voice coil motors (drive mechanism) provided in the photographic lens 11 is also possible. Alternatively, it is also possible that both the image sensor 17 and a lens that constitutes a portion of the photographing lens (photographing optical system) L are driven as "moving members" in a plane orthogonal to the optical axis. In either of these embodiments, an optical low-pass filter effect can be obtained by varying the position of the formation of an object image on the image sensor 17 to correct image shake and making object-emanating light rays incident on a plurality of pixels of the image sensor 17 which are mutually different in detection color.

Although the case where the predetermined path that the image sensor 17 traces is a rotationally symmetrical circular or square path having the center thereof on the optical axis Z of the photographic optical system has been illustrated in the above described embodiment, the present invention is not limited thereto; for instance, the predetermined path that the image sensor 17 traces can be defined as a linearlyreciprocal moving path which lies in a plane orthogonal to the optical axis Z of the photographic optical system.

INDUSTRIAL APPLICABILITY

It is desirable that the photographing apparatus and the photographing control system according to the present invention be used as a photographing apparatus and a photographing control system of a digital camera, etc.

REFERENCE SIGNS LIST

10 Digital camera (Photographing apparatus/Photographing control system)
11 Photographic lens
L Photographing lens group (Photographing optical system) (Moving member/Shake-correction member)
13 Diaphragm (Photographing optical system)
15 Shutter
17 Image sensor (Moving member/Shake-correction member)
17a Pixel
19 Memory
20 Camera body
21 DSP (CPU)
21A Exposure time setter
21B Exposure time determiner (Determiner)
21C Drive cycle setter
21D Image sensor drive controller (Moving member drive controller/Shake-correction member drive controller)
23 Display member
25 Memory card
27 Operating member
29 Low-pass filter operator panel
31 Diaphragm/shutter drive circuit
33 Image sensor oscillating circuit (Image sensor driver/Moving member driver/Shake-correction member driver)
33X X-axis drive circuit
33Y1 33Y2 Y-axis drive circuit
35 Memory
40 Image shake correcting apparatus (Image sensor driver/Moving member driver/Shake-correction member driver)
41 Fixed support board
42 Movable stage
431 432 433 Yoke
C1 C2 C3 Drive coil
H1 H2 H3 Hall sensor
M1 M2 M3 Magnet
R G B Color filter

The invention claimed is:

1. A photographing apparatus comprising:
an image sensor, to which an object image that is formed from object-emanating light rays passed through a photographing optical system, provided in said photographing apparatus, is exposed, and which converts said object image thus exposed into an electrical pixel signal;
a processor; and
a memory having instructions stored thereon, the instructions when executed causing the processor to perform operations including:
providing, with a driver, an optical low-pass filter effect by making said object-emanating light rays incident on a plurality of pixels of said image sensor which are mutually different in detection color by driving a moving member that includes at least one of a lens, which constitutes at least a portion of optical elements including said photographing optical system for formation of said object image, and said image sensor in a plane orthogonal to an optical axis of said photographing optical system so as to trace a predetermined path;
setting an exposure time;
setting a drive cycle of said moving member so that said exposure time becomes an integer multiple of said drive cycle of said moving member;
driving, with a controller, said moving member and controlling operation thereof via said driver so that said moving member traces said predetermined path in said orthogonal plane within said exposure time based on said drive cycle; and
determining whether said exposure time exceeds a predetermined period of time,
wherein, when determining that said exposure time does not exceed said predetermined period of time, setting said drive cycle of said moving member so that said exposure time becomes an integer multiple of said drive cycle, and
wherein, when determining that said exposure time exceeds said predetermined period of time, setting said drive cycle of said moving member without regard to a relationship between said drive cycle and said exposure time.

2. The photographing apparatus according to claim 1, wherein said moving member is driven and said operation is controlled by said controller via said driver so that said moving member traces said predetermined path twice or more in said orthogonal plane within said exposure time, which is set by said exposure time setter, based on said drive cycle, which is set by said drive cycle setter.

3. The photographing apparatus according to claim 1, wherein said exposure time becomes more than double than that of said drive cycle of said moving member.

4. The photographing apparatus according to claim 1, wherein said predetermined path that said moving member traces comprises a rotationally symmetrical circular or square path having a center thereof on said optical axis of said photographing optical system.

5. A photographing apparatus comprising:
an image sensor, to which an object image that is formed from object-emanating light rays passed through a photographing optical system is exposed, and which converts said object image thus exposed into an electrical pixel signal;
a processor; and
a memory having instructions stored thereon, the instructions when executed causing the processor to perform operations including:
providing, with a driver, an optical low-pass filter effect by making said object-emanating light rays incident on a plurality of pixels of said image sensor which are mutually different in detection color by driving a moving member that includes at least one of a lens, which constitutes at least a portion of optical elements including said photographing optical system for formation of said object image, and said image sensor in a plane orthogonal to an optical axis of said photographing optical system so as to trace a predetermined path;
setting an exposure time;
setting a drive cycle which is a time required for said moving member to be driven so that said moving member traces said predetermined path once in said orthogonal plane in accordance with said exposure time;

driving, with a controller, said moving member and controlling operation thereof via said driver so that said moving member traces said predetermined path in said orthogonal plane within said exposure time based on said drive cycle; and determining whether said exposure time exceeds a predetermined period of time, wherein, when determining that said exposure time does not exceed said predetermined period of time, setting said drive cycle of said moving member so that said exposure time becomes an integer multiple of said drive cycle, and wherein, when determining that said exposure time exceeds said predetermined period of time, setting said drive cycle of said moving member without regard to a relationship between said drive cycle and said exposure time.

6. A photographing control system comprising:

an image sensor, to which an object image that is formed from object-emanating light rays passed through said photographing optical system is exposed, and which converts said object image thus exposed into an electrical pixel signal;

a processor; and a memory having instructions stored thereon, the instructions when executed causing the processor to perform operations including:

providing, with a driver, an optical low-pass filter effect by making said object-emanating light rays incident on a plurality of pixels of said image sensor which are mutually different in detection color by driving a moving member that includes at least one of a lens, which constitutes at least a portion of optical elements including said photographing optical system for formation of an object image, and said image sensor in a plane orthogonal to an optical axis of said photographing optical system so as to trace a predetermined path;

setting an exposure time;

setting a drive cycle of said moving member so that said exposure time, which is set by said exposure time setter, becomes an integer multiple of said drive cycle of said moving member;

driving, with a controller, said moving member and controlling operation thereof via said driver so that said moving member traces said predetermined path in said orthogonal plane within said exposure time based on said drive cycle; and determining whether said exposure time exceeds a predetermined period of time, wherein, when determining that said exposure time does not exceed said predetermined period of time, setting said drive cycle of said moving member so that said exposure time becomes an integer multiple of said drive cycle, and wherein, when determining that said exposure time exceeds said predetermined period of time, setting said drive cycle of said moving member without regard to a relationship between said drive cycle and said exposure time.

* * * * *